US012372025B2

(12) United States Patent
Bouvy (10) Patent No.: US 12,372,025 B2
(45) Date of Patent: Jul. 29, 2025

(54) HYDROGEN-FUELED FOUR-STROKE INTERNAL COMBUSTION ENGINE

(71) Applicant: DMA TECH S.À R.L., Hobscheid (LU)

(72) Inventor: Jacques Bouvy, Udange (BE)

(73) Assignee: DMA TECH S.À R.L., Hobscheid (LU)

( * ) Notice: Subject to any disclaimer, the term of this patent is extended or adjusted under 35 U.S.C. 154(b) by 0 days.

(21) Appl. No.: 18/836,621

(22) PCT Filed: Feb. 10, 2023

(86) PCT No.: PCT/EP2023/053310
§ 371 (c)(1),
(2) Date: Aug. 7, 2024

(87) PCT Pub. No.: WO2023/152295
PCT Pub. Date: Aug. 17, 2023

(65) Prior Publication Data
US 2025/0116222 A1    Apr. 10, 2025

(30) Foreign Application Priority Data

Feb. 10, 2022 (LU) .......................... 501441
Apr. 8, 2022 (LU) .......................... 501822

(51) Int. Cl.
*F02B 47/02* (2006.01)
*F02B 43/10* (2006.01)
(Continued)

(52) U.S. Cl.
CPC ............. *F02B 47/02* (2013.01); *F02B 43/10* (2013.01); *F02D 19/024* (2013.01); *F02D 19/12* (2013.01);
(Continued)

(58) Field of Classification Search
CPC ............. F02M 25/025; F02M 25/0227; F02M 21/0206; F02D 41/0027; F02D 19/12; F02D 19/024; F02B 43/10; F02B 47/02
See application file for complete search history.

(56) References Cited

U.S. PATENT DOCUMENTS 10,858,990 B2    12/2020  Bouvy
11,415,083 B1 *   8/2022  Kavuri .................... F02B 41/06
(Continued)

FOREIGN PATENT DOCUMENTS

CN    112761780 A    5/2021

OTHER PUBLICATIONS

International Search Report for Application No. PCT/EP2023/053310, dated Apr. 21, 2023, 4 pages.
(Continued)

*Primary Examiner* — Kevin A Lathers
(74) *Attorney, Agent, or Firm* — CANTOR COLBURN LLP (57) ABSTRACT

A sparked reciprocating four-stroke internal combustion hydrogen-fueled engine having a casing, a rotatable crankshaft, a cylinder inside the casing, a piston inside the cylinder to movably reciprocate along an axis between top and bottom dead center positions (TDC, BDC) and operatively connected to the crankshaft such that the piston imparts a rotational movement to the crankshaft, a combustion chamber within the cylinder between the engine casing and piston head opposite the crankshaft, intake and exhaust valves, hydrogen and water injectors; a spark or glow plug, and an engine control unit to control timing and quantity of hydrogen and water injections by injecting into the combustion chamber first, second, and third quantities of hydrogen at first, second, and third timings, respectively, from 20° before TDC during compression stroke to 20° after TDC,
(Continued)

from 110° to 90° before TDC during compression stroke and from 180° to 100° before TDC during compression stroke.

15 Claims, 3 Drawing Sheets

(51) Int. Cl.
    *F02D 19/02*     (2006.01)
    *F02D 19/12*     (2006.01)
    *F02D 41/00*     (2006.01)
    *F02M 21/02*     (2006.01)
    *F02M 25/022*     (2006.01)
    *F02M 25/025*     (2006.01)

(52) U.S. Cl.
    CPC ..... *F02D 41/0027* (2013.01); *F02M 21/0206* (2013.01); *F02M 25/0227* (2013.01); *F02M 25/025* (2013.01)

(56) References Cited

U.S. PATENT DOCUMENTS

| | | | | |
|---|---|---|---|---|
| 2004/0003781 | A1* | 1/2004 | Yuki | F02M 25/03 |
| | | | | 123/25 C |
| 2012/0067325 | A1 | 3/2012 | Wathieu et al. | |
| 2016/0369750 | A1* | 12/2016 | Jung | F02B 75/021 |
| 2020/0056535 | A1* | 2/2020 | Bouvy | F02B 47/02 |
| 2022/0154654 | A1* | 5/2022 | Andersson | F02M 21/0239 |
| 2024/0337224 | A1* | 10/2024 | Kosaka | F02D 41/0027 |

OTHER PUBLICATIONS

Written Opinion for Application No. PCT/EP2023/053310, dated Apr. 21, 2023, 6 pages.

* cited by examiner

HYDROGEN-FUELED FOUR-STROKE INTERNAL COMBUSTION ENGINE

CROSS-REFERENCE TO RELATED APPLICATIONS

This application is a 35 U.S.C. § 371 National Stage patent application of PCT/EP2023/053310 filed 10 Feb. 2023, which claims the benefit of Luxembourg patent application LU501441 filed 10 Feb. 2022 and Luxembourg patent application LU501822 filed 8 Apr. 2022, the disclosures of which are incorporated herein by reference in their entirety.

TECHNICAL FIELD

The present disclosure generally relates to four-stroke internal combustion engines and in particular to hydrogen-fueled four-stroke internal combustion engines with enhanced efficiency, low pollution and high torque, as well as to a method for operating the same.

BACKGROUND

Four-stroke internal combustion engines are well known and generally comprise an engine casing, a crankshaft rotatable about a crankshaft axis, one or more cylinders arranged inside said engine casing, a piston arranged inside each cylinder to movably reciprocate along a reciprocating axis between a top dead center (TDC) position distal from said crankshaft and a bottom dead center (BDC) position proximal to said crankshaft. The reciprocating piston is operatively connected to the crankshaft such that it imparts a rotational movement to the crankshaft. Furthermore, the engine also comprises a combustion chamber defined within said cylinder between the engine casing and a head of the piston opposite of said crankshaft, at least one air intake valve and one exhaust valve per cylinder, means for feeding fuel into said combustion chamber, at least one spark plug per cylinder, if the engine is based on sparked ignition of the fuel air mixture, and generally an engine control unit for controlling the operation of the engine.

Four-stroke engines with direct fuel injection operate in a cycle with four consecutive strokes and repetitive cycles, said stroke being the following:

Intake stroke: the piston starts to move downward from the top dead center to bottom dead center, the intake valve opens, and air enters the combustion chamber.

Compression stroke: the piston moves back to top dead center from bottom dead center and compresses the air inside the cylinder and both the pressure and temperature inside the combustion chamber rise.

Combustion stroke (power stroke): generally, at the end of the compression stroke (before the piston reaches the top dead center) to very early in the combustion stroke, the fuel injectors start to inject fuel inside the combustion chamber. At some point, the fuel either spontaneously auto-ignites (compression ignition) or is ignited by a spark from a spark plug (spark ignition). The fuel-air mixture combustion produces a pressure on the piston head and pushes the piston downward, thereby transmitting the energy to the rotating crankshaft.

Exhaust stroke: after the piston hits the bottom of cylinder (bottom dead center), the piston starts to move upward, the exhaust valve opens and the sweep effect of the piston causes the exhaust gases to leave the combustion chamber towards the exhaust system and finally to the atmosphere.

Such engines have been largely operated with liquid or gaseous hydrocarbon fuels, but due to more stringent regulations regarding environmental considerations in unwanted carbon footprint, hydrogen seems to be an obvious and elegant solution to avoid the release of carbon oxides and unburned hydrocarbons altogether.

However, substituting hydrocarbon fuels with hydrogen as a fuel is not trivial. Hydrogen has many properties which are clearly different from hydrocarbon fuels, even compared to seemingly similar gaseous hydrocarbon fuels such as methane or propane.

First, hydrogen has the highest mass to energy ratio among the chemical fuels and, in terms of mass to energy consumption, it outperforms conventional gasoline fuel by approximately 3 times, alcohol by 5 to 6 times, and methane and propane by 2.5 times.

Second, hydrogen has a very high combustion velocity or flame speed in the engine combustion chamber, which is about 6 times higher than gasoline. At stoichiometric air to fuel ratios, the hydrogen flame speed is nearly an order of magnitude higher (faster) than that of gasoline.

Third, hydrogen has wide flammability limits compared to other fuels, from 4 to 75% by volume at 25° C. and 1 bar compared e.g. to 1.4 to 2.3% by volume in air in the case of gasoline.

Fourth, hydrogen has a very low ignition energy. The minimum ignition energy of a hydrogen-air mixture is only 0.017 mJ, whereas that of other flammable gases such as gasoline, methane or propane is usually on the order of 0.1 mJ.

Fifth, hydrogen has however a relatively high auto ignition temperature of about 585° C. compared to about 350° C. for gasoline. Despite its low ignition energy, this makes it difficult to ignite a hydrogen-air mixture on the basis of heat alone without an additional ignition source.

Sixth, hydrogen has a very high molecular diffusivity, meaning that its ability to disperse into air is considerably greater than gasoline.

Seventh, hydrogen has a small quenching distance of about 0.6 mm compared to 2.0 mm for gasoline. Hence, the distance from the internal cylinder wall where the combustion flame extinguishes is significantly smaller, which can adversely affect the lubricant film on the cylinder walls and increases the risk of backfire.

Eighth, hydrogen has a well-known and undesirable effect on the mechanical properties on commonly used metals, such as iron and steel, generally referred to as embrittling effect of hydrogen, which leads to a decrease in ductility and true stress at fracture of these metals.

While at least some of these properties seem desirable and advantageous at first glance, they clearly add up to render challenging a seemingly trivial substitution of hydrocarbon fuels with hydrogen.

This is all the more true, because some of these properties, namely the first six properties, lead to significantly higher combustion temperatures which in turn increase the unwanted production of NOx during combustion. Furthermore, higher combustion temperatures combined to the shorter quenching distance and the embrittling effect add a further challenge to the substitution of hydrocarbon fuels with hydrogen.

Document US 2004/0003781 A1 describes a method wherein critical water is injected into a combustion chamber.

SUMMARY

The present disclosure provides a four-stroke internal combustion engine which is particularly configured to the use of hydrogen as a fuel by allowing for a more efficient operation without compromising on its high potential of environmentally clean solution of producing power, in particular regarding the release of NOx. The disclosure further provides a corresponding method for operating such an engine in order to enhance both its performance and its environmentally advantageous aspects.

In order to overcome at least some of the above-mentioned problems and to achieve the object, the present disclosure proposes, in a first aspect, a sparked reciprocating four-stroke internal combustion hydrogen-fueled engine comprising an engine casing, a crankshaft rotatable about a crankshaft axis, a cylinder arranged inside said engine casing, a piston arranged inside said cylinder to movably reciprocate along a reciprocating axis between a top dead center (TDC) position distal from said crankshaft and a bottom dead center (BDC) position proximal to said crankshaft and operatively connected to the crankshaft such that the reciprocating piston imparts a rotational movement to the crankshaft, a combustion chamber defined within said cylinder between the engine casing and a head of the piston opposite said crankshaft, an intake valve, an exhaust valve, a hydrogen injector configured to directly inject hydrogen into said combustion chamber, a water injector configured to directly inject water into said combustion chamber; a spark or glow plug, and an engine control unit configured to control timing and quantity of hydrogen injection and of water injection, wherein said engine control unit is configured to inject into the combustion chamber a third quantity of hydrogen at a third timing from 180° to 100° before TDC during compression stroke, to inject into the combustion chamber a first quantity of hydrogen at a first timing from 20° before TDC during compression stroke to 20° after TDC and to inject a second quantity of (liquid or gaseous) water into the combustion chamber at a second timing from 110° to 90°, preferably from less than 110° to more than 90°, such as from 107.5° to 92.5° or even from 105° to 95° before TDC during compression stroke.

As a preliminary note in the present context, the ordinal numerals "first", "second", "third" and "fourth" are only used to qualify the terms "quantity" and "timing" and to unequivocally link a respective "quantity" of injected material, i.e. hydrogen or water, to its "timing" of injection. Hence, a "first quantity" is injected at a "first timing", a "second quantity" is injected at a "second timing", etc. The ordinal numerals thus do not infer any other mutual relationship of nature, magnitude, importance, chronological order, etc. Thus, the total quantity of hydrogen per cycle is the sum of the first quantity of hydrogen and the third quantity of hydrogen injected at first and third timings, whereas the total quantity of water injected per cycle is equal to the second quantity of water injected at second timing, or, in some advantageous embodiments further explained below, the sum of the second quantity of water and a fourth quantity of water injected at second and fourth timings.

The inventors have found that the injection of liquid water during compression stroke at a timing from about 110° to about 90° before TDC allows to overcome some of the problems arising from the use of hydrogen and its particular properties mentioned above. Indeed, the introduction of a quantity of water into the combustion chamber not only allows reducing the temperature within the combustion chamber during compression, but moreover to lessen the temperature during combustion, thereby decreasing the production of undesirable NOx. In fact, it appears that the injection of water, even well before the combustion is triggered by the spark or glow plug, even well before the first quantity of hydrogen is injected, allows to control at least to some extent the consequences of the high mass to energy ratio and the very high combustion velocity of hydrogen. Such a relatively early injection of water into the combustion chamber is however not only beneficial in terms of at least partially taming the hydrogen combustion, but it can further be done in an energetically advantageous manner. Actually, at a timing from about 110° to about 90° before TDC, the pressure (and the temperature) inside the cylinder is still relatively low, meaning that the injection of water at that stage does neither require high pressure injectors, nor any expensive and energy-intensive high-pressure pumps. Hence, the water is generally injected in liquid form at temperatures well below 150° C., preferably below about 100° C., such as below 70° C., below 50° C. or even at about ambient temperature.

Generally speaking, when injecting water into the combustion chamber of an internal combustion engine, there is a risk that the water does not evaporate sufficiently fast and deposits on the cylinder walls, thereby compromising the integrity of the lubricant film on said cylinder walls and leading to lubricant dilution, which are all the more detrimental in a hydrogen-fueled engine due to its embrittling effect and its small quenching distance mentioned above. The inventors found that by injecting a relatively small (third) quantity of hydrogen at a time before the injection (the second quantity) of liquid water, this negative effect of water deposition can be largely controlled or even prevented. It is thought that this favorable effect is due to the hydrogen's very high molecular diffusivity mentioned above, which promotes the dispersion of water and thereby improves its evaporation, which in turn reduces the risk of a detrimental deposition on the cylinder walls. To obtain said effect, the (third quantity of) hydrogen can be injected at a (third) timing from 180° to 100° before TDC during compression stroke, most preferably at the latest before starting the injection of the second quantity of water.

It has also been determined that the advantageous dispersing effect of hydrogen on water injection can be obtained with only relatively small amounts of hydrogen as a third quantity. Indeed, advantageously, said engine control unit is configured to control the third quantity of hydrogen to represent 5 to 50 wt.-%, preferably 10 to 45 wt.-%, and in particular 15 to 40 wt.-%, of the total quantity of hydrogen, said total quantity of hydrogen (per cycle) being the sum of the third quantity and the first quantity of hydrogen.

Although early injection of effective quantities of water is most likely to lead to lubricant film disruption or lubricant dilution because the temperature within the cylinder at that time is too low to ensure evaporation of the water, the inventors surprisingly established that this does not at all preclude from any injection of water at these early timings if operating according to the present disclosure. Indeed, due to the early injection of the third quantity of hydrogen and its dispersive effect stemming from its very high molecular diffusivity, an injection of relatively small amounts of water can be done even very early during compression stroke, thereby allowing for an additional amount of water to be introduced into the combustion chamber without risking lubrification issues. Hence, in advantageous embodiments, the engine control unit is configured to further inject into the combustion chamber a fourth quantity of water at a fourth timing from 180° to 110° before TDC during compression stroke. The third quantity of hydrogen can start before, at the same time or after the injection of the fourth quantity of water, meaning that there may be a timely overlap of the fourth quantity of water with the injection of the third quantity of hydrogen. Advantageously, the fourth quantity of water is injected at a fourth timing which is at the earliest simultaneously with the injection of the third quantity of hydrogen.

Preferably, said engine control unit is configured to control the fourth quantity of water to represent 0.5 to 5 wt.-%, preferably 0.75 to 4 wt.-%, in particular 0.85 to 3.0 wt.-%, of the total quantity of water, the total quantity of water per cycle being the sum of the second quantity of water and the fourth quantity of water.

Further to the advantageous features and effects of the present disclosure already mentioned above, a still further of its main benefits is the fact that the presence of the added water reduces knocking, which in turn allows to operate the internal combustion engine at lambda values (i.e. the air to fuel equivalence ratio) which are significantly lower than those generally useful for hydrogen-fueled internal combustion engines. Indeed, in view among others of the high mass to energy ratio and the very high combustion velocity of hydrogen, hydrogen-fueled engines have generally to be operated in extremely lean conditions, both for reasons of engine temperature control and for NOx reduction. As a consequence, conventional hydrogen-fueled engines cannot be operated with high brake thermal efficiencies, e.g. as high as those known from diesel engines.

Now, the efficient water injection of the present disclosure, be it with only the injection of the second quantity of water at the second timing or with the additional early injection of the fourth quantity of water at the fourth timing, allow to operate at lambda values which are significantly reduced lambda values compared to lambda values in conventional hydrogen-fueled internal combustion engines, thereby allowing for an operation at higher efficiencies. As a consequence, the engine control unit is generally configured to control the total quantity of hydrogen per cycle and the total quantity of liquid water per cycle (the latter being either only the second quantity of water if there is no injection of a fourth quantity of water or otherwise the sum of the second and fourth quantities of water) to obtain a lambda value between 1.5 and 2.5, preferably between 1.6 and 2.4, more preferably between 1.7 and 2.3.

The efficient water injection of the present disclosure thus also eliminates or at least reduces the need for additional expensive and complex equipment, such as exhaust gas recirculation (EGR) valves or advanced turbo compressors.

It has been further found that the water to hydrogen mass ratio is surprisingly largely independent of the engine's speed and that the benefits of the disclosure, such as a more efficient operation, lower NOx production, lower engine stress, etc. can not only be obtained for stationary engines operating only at particular values of rotations per minute, such as in electric generators, but are also applicable to any other type of application, such as in particular for vehicle engines. Advantageously, the engine control unit is configured to control the total quantity of hydrogen and the total quantity of water to obtain a water to hydrogen mass ratio of between 1.0 and 2.0, preferably between 1.3 and 1.9, more preferably between 1.5 and 1.7, such as about 1.6.

In particularly advantageous embodiments of the sparked reciprocating four-stroke internal combustion hydrogen-fueled engine according to the present disclosure, the first timing is from 15° before TDC during compression stroke to 15° after TDC and/or the second timing is from 105° to 95°, preferably about 100°, before top dead center (TDC) during compression stroke and/or the third timing of injecting hydrogen is 175° to 120°, before TDC during compression stroke and/or, if applicable, the fourth timing is from 175° to 120° before TDC during compression stroke.

The addition of liquid water which transforms into a gas allows for reducing the temperature, which in turn allows for increasing the actual compression ratio, i.e. the ratio between the volume of the cylinder and combustion chamber in an internal combustion engine at their maximum and minimum values. In preferred sparked reciprocating four-stroke internal combustion hydrogen-fueled engines, the actual compression ratio of the engine is between 12.9:1 and 17:1, preferably between 13.4:1 and 16.5:1, more preferably between 13.9 and 16.

In a second aspect, the disclosure similarly proposes a method of operating a sparked reciprocating four-stroke internal combustion hydrogen-fueled engine, preferably an engine according to the first aspect, comprising an engine casing, a crankshaft rotatable about a crankshaft axis, a cylinder arranged inside said engine casing, a piston arranged inside said cylinder to movably reciprocate along a reciprocating axis between a top dead center (TDC) position distal from said crankshaft and a bottom dead center (BDC) position proximal to said crankshaft and operatively connected to the crankshaft such that the reciprocating piston imparts a rotational movement to the crankshaft, a combustion chamber defined within said cylinder between the engine casing and a head of the piston opposite said crankshaft, an intake valve, an exhaust valve, a hydrogen injector configured to directly inject hydrogen into said combustion chamber, a water injector configured to directly inject water into said combustion chamber; a spark or glow plug, and an engine control unit, configured to implement the steps of the method, said method comprising at each four-stroke cycle the steps of:

a) injecting a third quantity of hydrogen at a third timing from 180° to 100° before TDC during compression stroke into the combustion chamber through the hydrogen injector, b) injecting a first quantity of hydrogen at a first timing from 20° before TDC during compression stroke to 20° after TDC into the combustion chamber through the hydrogen injector, and c) injecting a second quantity of water at a second timing from 110° to 90°, preferably from less than 110° to more than 90°, such as from 107.5° to 92.5° or even from 105° to 95°, before TDC during compression stroke through the water injector into the combustion chamber.

In the present method of operating a sparked reciprocating four-stroke internal combustion hydrogen-fueled engine, the third quantity of hydrogen in step a) is preferably controlled to represent 5 to 50 wt.-% of the total quantity of hydrogen, said total quantity of hydrogen being the sum of the third quantity and the first quantity of hydrogen.

Advantageously, the method further comprises the step of:

d) injecting a fourth quantity of water at a fourth timing from 180° to 110° before TDC during compression stroke through the water injector into the combustion chamber.

The fourth quantity of water is preferably controlled to represent 0.5 to 5 wt.-% of the total quantity of water, wherein said total quantity of water is the sum of the second quantity of water and the fourth quantity of water.

In particularly beneficial embodiments, the total quantity of hydrogen and the second or the total quantity of water is controlled to obtain a lambda value between 1.5 and 2.5, preferably between 1.6 and 2.4, more preferably between 1.7 and 2.3, the lambda value being the air to fuel equivalence ratio.

In the method of operating a sparked reciprocating four-stroke internal combustion hydrogen-fueled engine, the total quantity of hydrogen and the total quantity of water is preferably controlled to obtain a water to hydrogen mass ratio of between 1.0 and 2.0, more preferably between 1.3 and 1.9, most preferably between 1.5 and 1.7, such as in particular about 1.6.

The method of operating a sparked reciprocating four-stroke internal combustion hydrogen-fueled engine may be controlled in such a way that in step a) the third timing of injecting hydrogen is set from 180° to 100°, preferably from 175° to 120°, before TDC during compression stroke and/or that in step c) the first timing is set from 15° before TDC during compression stroke to 15° after TDC and/or the in step b) second timing is set from 105° to 95°, preferably about 100°, before top dead center (TDC) during compression stroke and/or that the fourth timing, if applicable, is set from 180° to 110°, preferably from 175° to 120° before TDC during compression stroke.

The timings of the internal combustion engine in general, and more particularly the timings of injection as indicated herein are indicated by an angle of the crankshaft expressed in relation with the reciprocating piston's position within a cylinder of the engine, if necessary relative to the relevant stroke of the operating cycle. The expression "top dead center" or "TDC" and "bottom dead center" or "BDC" are generally known expressions in the art of internal combustion engines and refer to both end positions of the reciprocating piston, or more particularly the top of the piston, within the cylinder along the reciprocating axis. The top dead center is the position of the piston when it is distal from the crankshaft, whereas the bottom dead center is the position proximal to the crankshaft. Positions along the reciprocating axis are thus generally given in degrees (°) from either dead center, relative to and in the sense of rotation of the crankshaft. Often the above expressions are preceded by the preposition "after" or "before". For example: "110° before top dead center" (shortens to 110° before TDC or 110° BTDC) means that the top of the piston is at a position along the reciprocating axis which corresponds to a rotation angle of the crankshaft at −110° relative to the top dead center. A notation of a range between "−20° to +20° from top dead center" is equivalent to "from 20° before top dead center to 20° after top dead center" or "20° before TDC to 20° after TDC".

Furthermore, indications of injection timings in the present context mean the beginning of the corresponding injection(s). Indeed, although injection durations are necessarily short, they inevitably require some time, during which the piston continues its pathway within the cylinder.

The intake valve(s) and the exhaust valve(s) may be any appropriate type of valve, preferably these are independently poppet valves used in almost all four stroke engines, sliding valves or rotating disk valves, being either driven by the engine itself (the engine thus being the actuator), such as by camshafts, or driven by separate actuators, such as pneumatic, hydraulic or electric actuators. For example, a valve system designed as a slide or spinning disk may advantageously allow for a set timing of the opening and closing of the exhaust valve at bottom dead center and opening of the intake valve prior to the closing of the exhaust valve.

The internal combustion engine of the disclosure may advantageously further comprise a water tank as a water supply to feed the water injector(s), as well as a condenser unit downstream of the exhaust valve(s). This condenser unit, e.g. a heat exchanger, can be provided to condense the steam from the exhaust gas to water, which may then be fed through conducts to the water tank. Such a recycling of the water used for the steam production is of particular interest for mobile applications where the quantities of carried water should usually be limited. Furthermore, recycling the water also reduces the number of water refills. There may also be provided filtering means to filter the exhausted steam. The water tank is preferably designed for both water filling by a normal filling cap and the filling by the condensed exhausted water.

The internal combustion engine of the disclosure may of course be composed of a plurality of cylinders. Furthermore, each of these cylinders may comprise a plurality of water injectors preferably distributed along a perimeter of the combustion chamber. The water injectors may be located at any appropriate position of the cylinder which is situated inside the combustion chamber.

All explicit values provided herein should be understood as approximate values unless explicitly otherwise stated. Hence, each of said explicit values should be understood as comprising a range of values of between 10% below and 10% above said value. Explicit values preceded by the word "about", "approximately" or similar should be understood as comprising a range of values of between 20% below and 20% above said values.

BRIEF DESCRIPTION OF THE DRAWINGS

Preferred embodiments of the disclosure will now be described, by way of example, with reference to the accompanying drawings in which:

FIGS. 1 to 3 are schematic partly cross-sectional views of an embodiment of a sparked reciprocating four-stroke internal combustion hydrogen-fueled engine at different timings during compression stroke; wherein

Further details and advantages of the present disclosure will be apparent from the following detailed description of several not limiting embodiments with reference to the attached drawings.

DETAILED DESCRIPTION OF THE DRAWINGS

Figure 1:
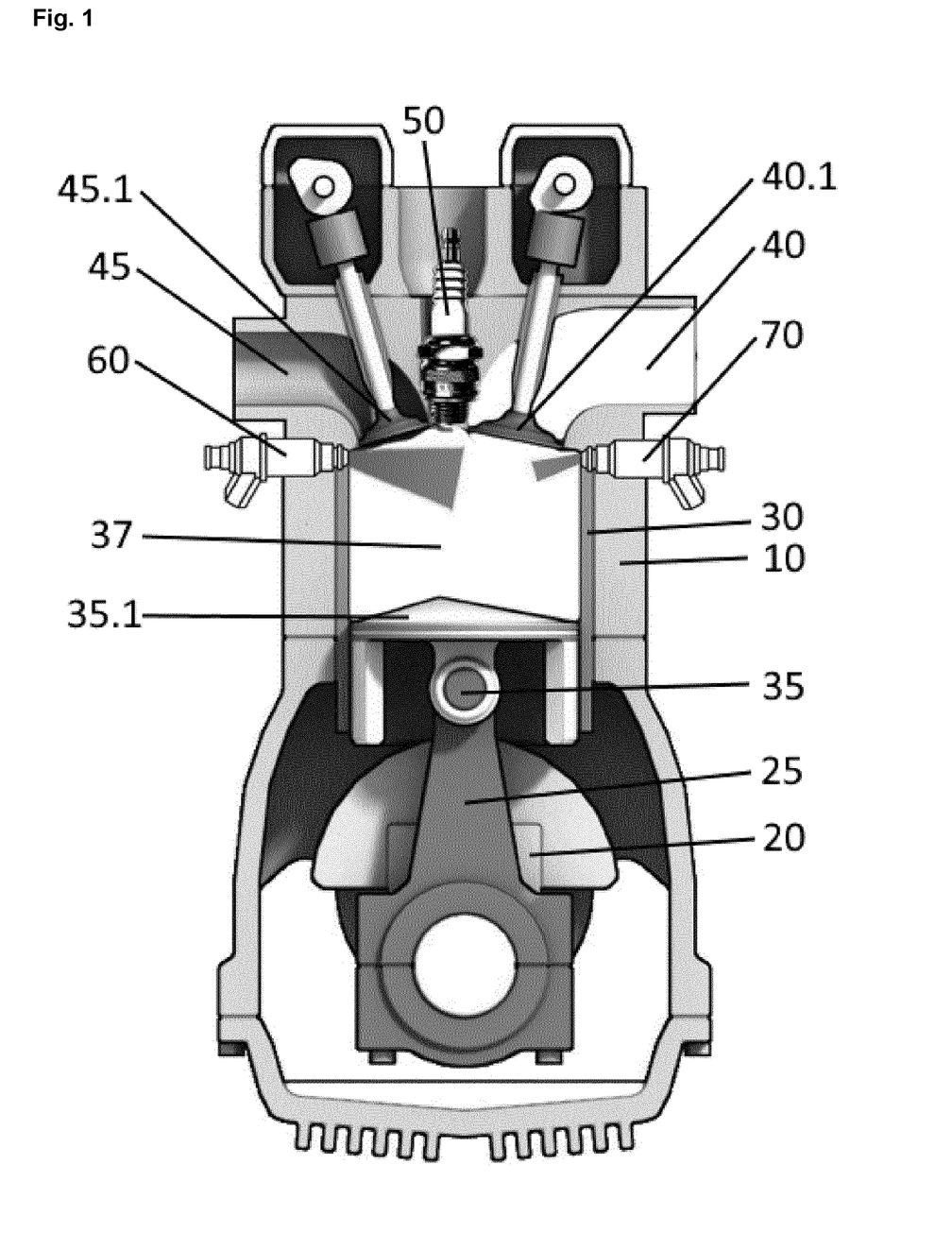
FIG. 1 shows the engine at a timing of 180° before TDC (i.e. at BDC)
Figure 2:
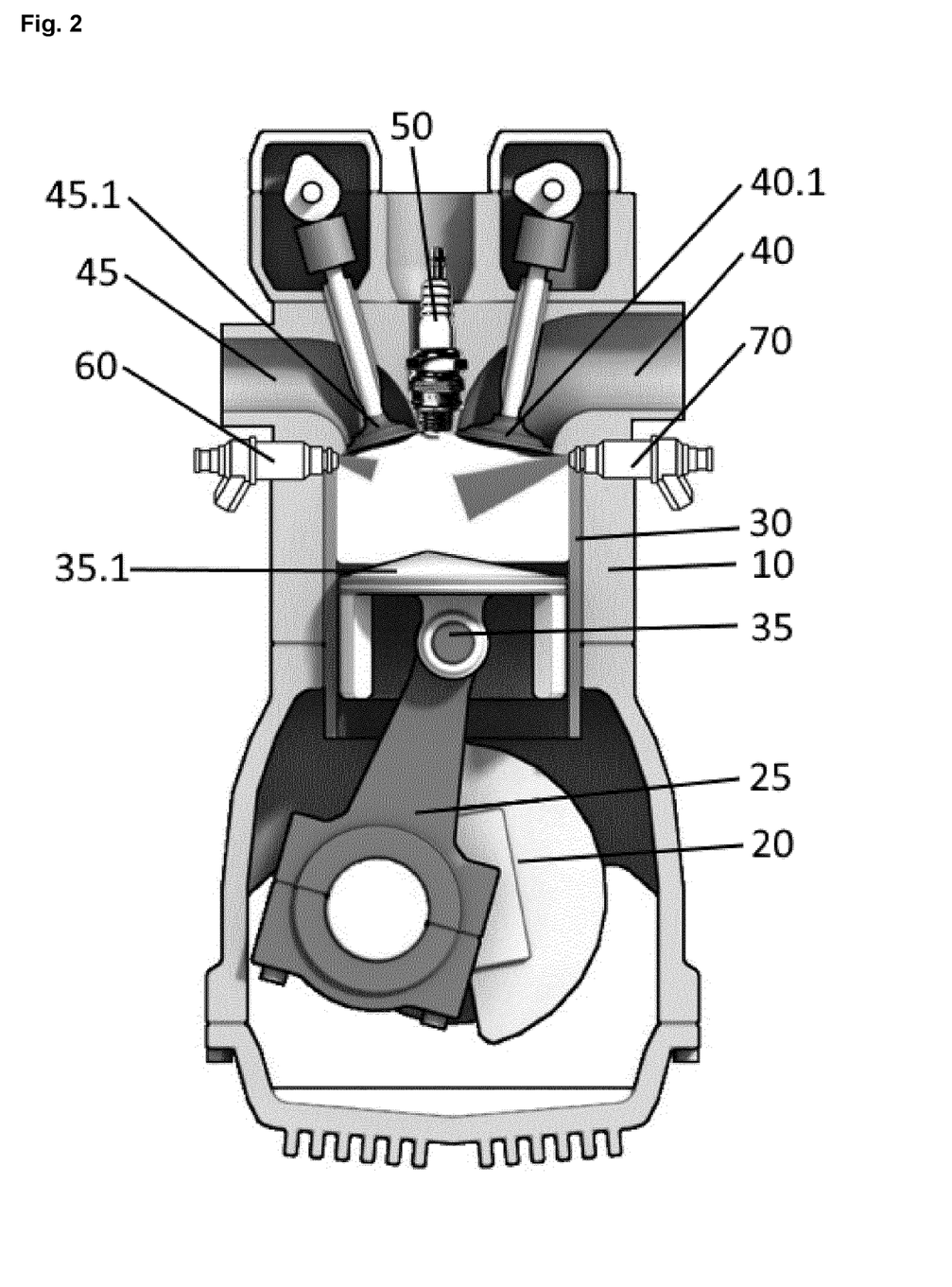
FIG. 2 shows the engine at a timing of about 110° to 90° before TDC and FIG. 3 shows the engine at a timing of about 20° before TDC.
Figure 3:
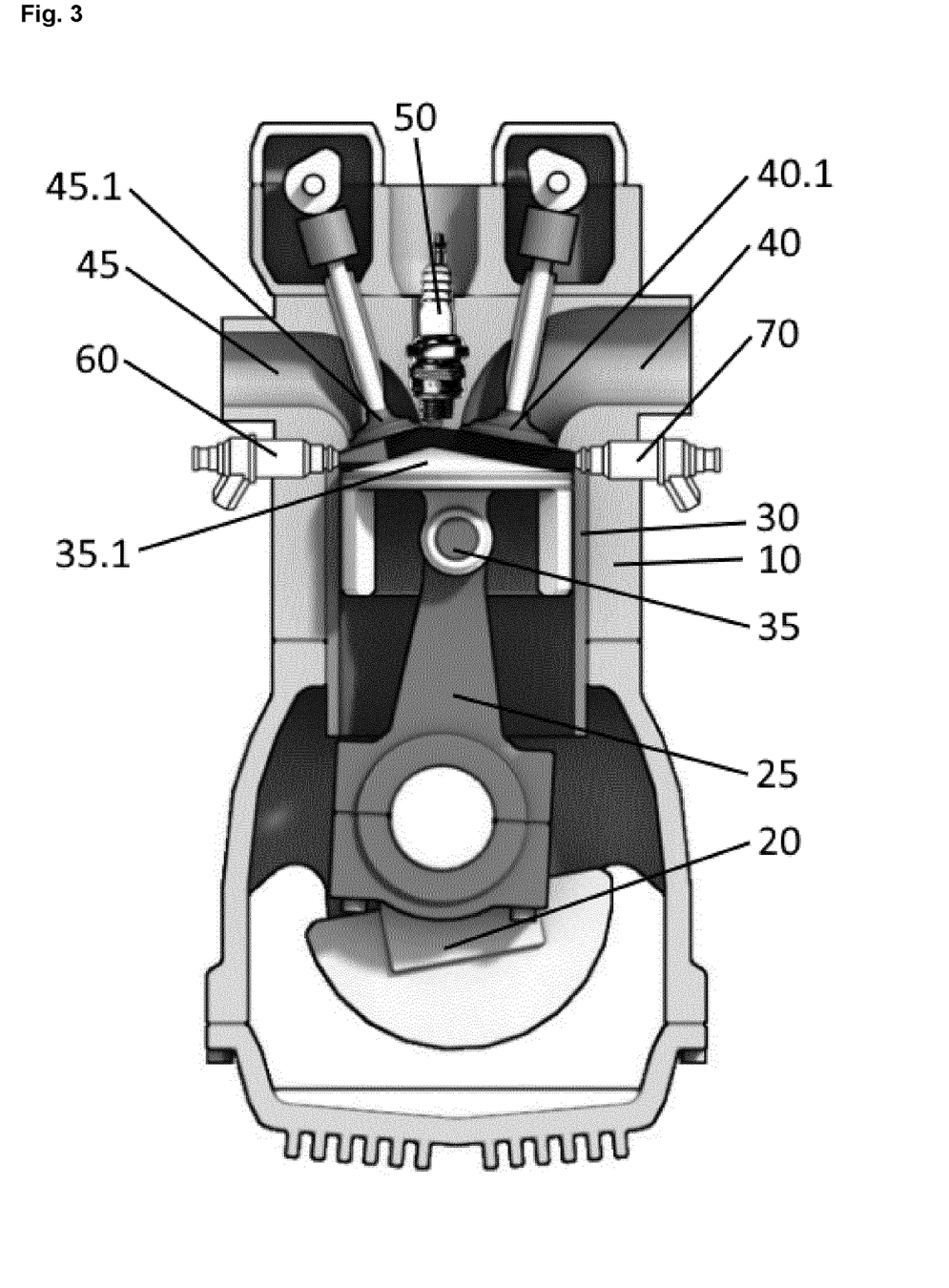

FIG. 1 to FIG. 3 are schematic representations of an embodiment of a sparked reciprocating four-stroke internal combustion hydrogen-fueled engine of the disclosure. Like reference numerals in these drawings represent identical features.

The internal combustion engine has an engine casing 10, a crankshaft 20 rotatable about a crankshaft axis, a cylinder 30 arranged inside said engine casing 10, and a piston 35 with its piston head 35.1 arranged inside said cylinder to movably reciprocate along a reciprocating axis between a top dead center (TDC) position distal from said crankshaft 20 and a bottom dead center (BDC) position proximal to said crankshaft 20 and operatively connected by means of a rod 25 to the crankshaft such that the reciprocating piston 35 imparts a rotational movement to the crankshaft. A combustion chamber 37 is defined within said cylinder 30 between the engine casing 10 and the piston head 35.1 opposite said crankshaft 20. A spark or glow plug 50 is arranged such that its glow or spark tip is located in the combustion chamber 37. An air intake 40 is in fluid connection with the combustion chamber 37 when intake valve 40.1 is open during the intake stroke (not shown) and cut from said fluid connection when the intake valve 40.1 is closed (i.e. essentially during compression stroke, combustion stroke and exhaust stroke). An exhaust outlet 45 is in fluid connection with the combustion chamber when exhaust valve 45.1 is open during the exhaust stroke (not shown) and cut from said fluid connection when the exhaust valve 45.1 is closed (i.e. essentially during intake stroke, compression stroke and combustion stroke). A hydrogen injector 60 is configured to directly inject hydrogen into said combustion chamber 37 and a water injector 70 is configured to directly inject (liquid) water into said combustion chamber 37.

FIG. 1 shows the engine at a timing of 180° before TDC, i.e. at BDC, at the beginning of the compression stroke. At a third timing between 180° to 100° before TDC, e.g. in this particular case of 180° before TDC, a third quantity of hydrogen is injected through the hydrogen injector 60 into the combustion chamber 37. At a fourth timing of between 180° to 110° before TDC, e.g. in this particular case of 180° before TDC, a fourth quantity of water is injected through the water injector 70 into the combustion chamber 37. Although in FIG. 1 both injections occur simultaneously at 180° before TDC, both injections could be separate in time or overlap within the ranges for the third and fourth timings. The third quantity of hydrogen is generally small to medium, such as 5 to 50 wt.-%, compared to the overall hydrogen quantity needed for an efficient operation and generally helps to better disperse the injected fourth quantity of water due to the very high molecular diffusivity of hydrogen. The fourth quantity of water is only a fraction of the total amount of water injection per cycle, such as from 0.5 to 5 wt.-% of the total water quantity. Water is preferably injected as a liquid at temperatures below 100° C., usually at the temperatures from ambient temperature to 70° C. Injection of water (and of hydrogen) at this stage does not require high pressure injection as the pressure in the combustion chamber is about atmospheric pressure (in the absence of compressor or turbo charging) or slightly above (in the presence of compressor or turbo charging).

FIG. 2 shows the same engine at a timing of about 110° to 90° before TDC during the early stages of the compression stroke. At a second timing between 110° and 90° before TDC, a second quantity of water is injected through the water injector 70 into the combustion chamber 37. At this time the fourth timing of injecting a fourth quantity of water is over, while the third timing of injecting a third quantity of hydrogen can still be ongoing if the second timing is started before 100° before TDC. So, although in FIG. 2 both injections occur simultaneously at about 110° to 100° before TDC, the injection of the larger second quantity of water could also be the sole injection at this time. Again, the third quantity of hydrogen helps to better disperse the injected second quantity of water due to the very high molecular diffusivity of hydrogen. The second quantity of water represents the major fraction of the total amount of water injection per cycle, such as from 95 to 99.5 wt.-% of the total water quantity. Again, even at this timing the pressure inside the combustion chamber is still relatively low, so that the injection of water at this stage does still not require high pressure injection.

FIG. 3 again shows the same engine at a timing of about 20° before TDC, i.e. at the end of the compression stroke. About this time, from 20° before TDC during compression stroke to 20° after TDC, the main first quantity of hydrogen is injected under high pressure into the combustion chamber to be ignited by the spark or glow plug 50 at the end of or after the injection of the first quantity of hydrogen, thereby starting the combustion of the air-water-hydrogen mixture.

The invention claimed is:

1. A sparked reciprocating four-stroke internal combustion hydrogen-fueled engine comprising an engine casing, a crankshaft rotatable about a crankshaft axis, a cylinder arranged inside said engine casing, a piston arranged inside said cylinder to movably reciprocate along a reciprocating axis between a top dead center (TDC) position distal from said crankshaft and a bottom dead center (BDC) position proximal to said crankshaft and operatively connected to the crankshaft such that the reciprocating piston imparts a rotational movement to the crankshaft, a combustion chamber defined within said cylinder between the engine casing and a head of the piston opposite said crankshaft, an intake valve, an exhaust valve, a hydrogen injector configured to directly inject hydrogen into said combustion chamber, a water injector configured to directly inject water into said combustion chamber; a spark or glow plug, and an engine control unit configured to control timing and quantity of hydrogen injection and of water injection, wherein said engine control unit is configured to inject hydrogen into the combustion chamber at a first timing from 20° before TDC during compression stroke to 20° after TDC, to inject water into the combustion chamber at a second timing from 110° to 90° before TDC during compression stroke and to inject hydrogen into the combustion chamber at a third timing from 180° to 100° before TDC during compression stroke.

2. The sparked reciprocating four-stroke internal combustion hydrogen-fueled engine according to claim 1, wherein said engine control unit is configured to control the quantity of hydrogen injected at the third timing to represent 5 to 50 wt.-% of the total quantity of hydrogen, wherein said total quantity of hydrogen is the sum of the quantities of hydrogen injected at the first and third timings.

3. The sparked reciprocating four-stroke internal combustion hydrogen-fueled engine according to claim 1, wherein said engine control unit is configured to further inject water into the combustion chamber at a fourth timing from 180° to 110° before TDC during compression stroke.

4. The sparked reciprocating four-stroke internal combustion hydrogen-fueled engine according to claim 3, wherein said engine control unit is configured to control the quantity of water injected at the fourth timing to represent 0.5 to 5 wt.-% of the total quantity of water, wherein said total quantity of water is the sum of the quantities of water injected at the second and fourth timings.

5. The sparked reciprocating four-stroke internal combustion hydrogen-fueled engine according to claim 1, wherein said engine control unit is configured to control the total quantity of hydrogen and the quantity of water injected at the second timing or the total quantity of water to obtain a lambda value between 1.5 and 2.5, the lambda value being the air to fuel equivalence ratio.

6. The sparked reciprocating four-stroke internal combustion hydrogen-fueled engine according to claim 1, wherein said engine control unit is configured to control the total quantity of hydrogen and the total quantity of water to obtain a water to hydrogen mass ratio of between 1.0 and 2.0.

7. The sparked reciprocating four-stroke internal combustion hydrogen-fueled engine according to claim 1, wherein the first timing is from 15° before TDC during compression stroke to 15° after TDC and/or the second timing is from 105° to 95°, before top dead center (TDC) during compression stroke and/or the third timing of injecting hydrogen is from 175° to 120°, before TDC during compression stroke and/or, if applicable, the fourth timing is from 175° to 120° before TDC during compression stroke.

8. The sparked reciprocating four-stroke internal combustion hydrogen-fueled engine according to claim 1, wherein compression ratio of the engine is between 12.9:1 and 17:1.

9. A method of operating a sparked reciprocating four-stroke internal combustion hydrogen-fueled engine comprising an engine casing, a crankshaft rotatable about a crankshaft axis, a cylinder arranged inside said engine casing, a piston arranged inside said cylinder to movably reciprocate along a reciprocating axis between a top dead center (TDC) position distal from said crankshaft and a bottom dead center (BDC) position proximal to said crankshaft and operatively connected to the crankshaft such that the reciprocating piston imparts a rotational movement to the crankshaft, a combustion chamber defined within said cylinder between the engine casing and a head of the piston opposite said crankshaft, an intake valve, an exhaust valve, a hydrogen injector configured to directly inject hydrogen into said combustion chamber, a water injector configured to directly inject water into said combustion chamber; a spark or glow plug, and an engine control unit, configured to implement the steps of the method, said method comprising at each four-stroke cycle the steps of:
  a) injecting hydrogen at a third timing from 180° to 100° before TDC during compression stroke into the combustion chamber through the hydrogen injector,
  b) injecting water at a second timing from 110° to 90° before TDC during compression stroke into the combustion chamber through the water injector, and
  c) injecting hydrogen at a first timing from 20° before TDC during compression stroke to 20° after TDC into the combustion chamber through the hydrogen injector.

10. The method of operating a sparked reciprocating four-stroke internal combustion hydrogen-fueled engine according to claim 9, wherein the quantity of hydrogen injected at the third timing in step a) is controlled to represent 5 to 50 wt.-% of the total quantity of hydrogen, wherein said total quantity of hydrogen is the sum of the quantities injected at the first and third timings.

11. The method of operating a sparked reciprocating four-stroke internal combustion hydrogen-fueled engine according to claim 9, further comprising the step of:
  d) injecting water at a fourth timing from 180° to 110° before TDC during compression stroke into the combustion chamber through the water injector.

12. The method of operating a sparked reciprocating four-stroke internal combustion hydrogen-fueled engine according to claim 9, wherein the quantity of water injected at the fourth timing is controlled to represent 0.5 to 5 wt.-% of the total quantity of water, wherein said total quantity of water is the sum of the quantity of water injected at the second and fourth timings.

13. The method of operating a sparked reciprocating four-stroke internal combustion hydrogen-fueled engine according to claim 9, wherein the total quantity of hydrogen and the quantity of water injected at the second timing or the total quantity of water is controlled to obtain a lambda value between 1.5 and 2.5, the lambda value being the air to fuel equivalence ratio.

14. The method of operating a sparked reciprocating four-stroke internal combustion hydrogen-fueled engine according to claim 9, wherein the total quantity of hydrogen and the total quantity of water is controlled to obtain a water to hydrogen mass ratio of between 1.0 and 2.0.

15. The method of operating a sparked reciprocating four-stroke internal combustion hydrogen-fueled engine according to claim 9, wherein in step a) the third timing of injecting hydrogen is set from 175° to 120°, before TDC during compression stroke and/or in step c) the first timing is set from 15° before TDC during compression stroke to 15° after TDC and/or the in step b) second timing is set from 105° to 95°, before top dead center (TDC) during compression stroke and/or, if applicable, the fourth timing is set from 175° to 120° before TDC during compression stroke.

* * * * *